US010282378B1

(12) United States Patent
Eusebi (10) Patent No.: US 10,282,378 B1
(45) Date of Patent: May 7, 2019

(54) SYSTEM AND METHOD FOR DETECTING AND FORECASTING THE EMERGENCE OF TECHNOLOGIES

(71) Applicant: Christopher A. Eusebi, Bloomfield, MI (US)

(72) Inventor: Christopher A. Eusebi, Bloomfield, MI (US)

( * ) Notice: Subject to any disclaimer, the term of this patent is extended or adjusted under 35 U.S.C. 154(b) by 685 days.

(21) Appl. No.: 14/249,810

(22) Filed: Apr. 10, 2014

Related U.S. Application Data (60) Provisional application No. 61/810,286, filed on Apr. 10, 2013.

(51) Int. Cl.
| | |
|---|---|
| *G06F 16/00* | (2019.01) |
| *G06Q 10/00* | (2012.01) |
| *G06F 16/95* | (2019.01) |
| *G06F 16/28* | (2019.01) |
| *G06F 16/335* | (2019.01) |

(52) U.S. Cl.
CPC ............ *G06F 16/95* (2019.01); *G06F 16/285* (2019.01); *G06F 16/335* (2019.01)

(58) Field of Classification Search
CPC ............ G06Q 10/00–50/00; G06F 1/00–21/00
USPC ................................................. 705/7.11–7.42
See application file for complete search history.

(56) References Cited

U.S. PATENT DOCUMENTS

| | | | | |
|---|---|---|---|---|
| 6,104,989 | A * | 8/2000 | Kanevsky | G06F 17/2715 704/257 |
| 6,360,227 | B1 * | 3/2002 | Aggarwal | G06F 17/30873 |
| 7,085,771 | B2 * | 8/2006 | Chung | G06F 17/2785 |
| 7,194,483 | B1 * | 3/2007 | Mohan | G06F 16/30 707/600 |
| 7,546,278 | B2 * | 6/2009 | Yang | G06K 9/6282 706/14 |
| 7,716,226 | B2 * | 5/2010 | Barney | G06F 17/30675 707/748 |
| 8,195,426 | B1 * | 6/2012 | Antanies | G05B 23/0232 600/302 |
| 9,177,249 | B2 * | 11/2015 | Abercrombie | G06N 5/02 |
| 9,183,600 | B2 * | 11/2015 | Chen | G06Q 50/184 |
| 9,256,667 | B2 * | 2/2016 | Koudas | G06F 17/30864 |
| 2001/0047254 | A1 * | 11/2001 | Rising, III | G06F 17/30017 704/9 |
| 2003/0030637 | A1 * | 2/2003 | Grinstein | G06F 17/3061 345/420 |
| 2003/0182310 | A1 * | 9/2003 | Charnock | G06F 17/30716 |
| 2004/0015481 | A1 * | 1/2004 | Zinda | G06F 17/3061 |
| 2006/0248055 | A1 * | 11/2006 | Haslam | G06F 17/30705 |
| 2007/0214186 | A1 * | 9/2007 | Yang | G06K 9/6282 |

(Continued)

OTHER PUBLICATIONS

Technology Futures Analysis Methods Working Group. "Technology futures analysis: Toward integration of the field and new methods." Technological Forecasting and Social Change 71.3 (2004): 287-303.*

(Continued)

*Primary Examiner* — Alan S Miller
(74) *Attorney, Agent, or Firm* — Lorenz & Kopf, LLP (57) ABSTRACT

The system provided herein is a computer-implemented system that defines a social network using the linkages of technologies. According to one the teachings, the system looks for pandemic spread or integration of technology through this network to determine when an outbreak of a new technology is occurring.

1 Claim, 5 Drawing Sheets

(56) References Cited

U.S. PATENT DOCUMENTS

| | | | | |
|---|---|---|---|---|
| 2010/0070448 | A1* | 3/2010 | Omoigui | H01L 27/1463 706/47 |
| 2010/0268714 | A1* | 10/2010 | Moon | G06F 17/30572 707/737 |
| 2012/0102033 | A1* | 4/2012 | Sarshar | G06F 17/30784 707/737 |
| 2012/0166180 | A1* | 6/2012 | Au | G06F 17/274 704/9 |
| 2013/0144605 | A1* | 6/2013 | Brager | G06F 16/30 704/9 |
| 2013/0151525 | A1* | 6/2013 | Ankan | G06F 16/316 707/737 |
| 2013/0317994 | A1* | 11/2013 | Tran | G06Q 50/184 705/310 |
| 2014/0006332 | A1* | 1/2014 | Abercrombie | G06N 5/02 706/46 |

OTHER PUBLICATIONS

Eusebi, Christopher A., and Richard Silberglitt. Identification and Analysis of Technology Emergence Using Patent Classification. Rand National Defense Research Inst Santa Monica CA, 2014.*

Meyer, Martin. "Patent citations in a novel field of technology—what can they tell about interactions between emerging communities of science and technology?." Scientometrics 48.2 (2000): 151-178. (Year: 2000).*

Daim, Tugrul U., et al. "Forecasting emerging technologies: Use of bibliometrics and patent analysis." Technological Forecasting and Social Change 73.8 (2006): 981-1012. (Year: 2006).*

Gerdsri, Nathasit, and Tugrul U. Daim. "Generating intelligence on the research and development progress of emerging technologies using patent and publication information." Management of Innovation and Technology, 2008. ICMIT 2008. 4th IEEE International Conference on. IEEE, 2008. (Year: 2008).*

Spatial Preferential Attachment Networks: Power Laws and Clustering Coefficients, Emmanuel Jacob et al., Oct. 12, 2012, pp. 1-25.

Multidimensional Networks and the Dynamics of Sociomateriality: Bringing Technology Inside the Network, Noshir S. Contractor, et al., 2011, 40 pages.

Applied Actant-Network Theory: Toward the Automated Detection of Technoscientific Emergence from Full-Text Publications and Patents, David C. Brock, et al., 2012, pp. 8-16.

Benchmarking Bayesian neural networks for time series forecasting, Rafael A. Calvo et al., 5 pages.

Coauthorship and citation in scientific publishing, Travis Martin, et al., Apr. 1, 2013, 10 pages.

How to Build Your Network, Harvard Business Review by Brian Uzzi and Shannon Dunlap, Dec. 2005, pp. 1-9.

Patent Portfolios, Gideon Parchomovsky and R. Polk Wagner, 78 pages.

Total Variation Error Bounds for Geometric Approximation, Erol Peköz, Adrian Röllin and Nathan Ross, Jun. 23, 2011, pp. 1-29.

Reviews of Modern Physics, vol. 74, Jan. 2002, Statistical mechanics of complex networks, Rèka Albert and Albert-László Barabási, Published Jan. 30, 2002, pp. 47-97.

A Big Data Approach to Computational Creativity, Lav R. Varshney, Florian Pinel, Kush R. Varshney, Debarun Bhattacharjya, Angela Schörgendorfer and Yi-Min Chee, Nov. 5, 2013, pp. 1-16.

Complex Adaptive Systems and the Diffusion of Innovations, Everett M. Rogers et al., The Innovation Journal: The Public Sector innovation Journal, vol. 10(3), article 30, pp. 1-26.

Power-Law Distribgutions in Empirical Data, Aaron Clauset, Cosma Rohilla Shalizi and M.E.J. Newman, Feb. 2, 2009, pp. 1-43.

Competition-Induced Critically in a Model of Meme Popularity, James P. Gleeson et al. Jan. 31, 2014, pp. 1-5.

Hysteresis effects of changing parameters of noncooperative games, David H. Wolpert et al. Mar. 2, 2011, pp. 1-5.

Robustness and complexity co-constructed in multimodal signalling networks, Nihat Ay et al. Jan. 11, 2007, pp. 441-447.

Policing stabilizes construction of social niches in primates, Jessica C. Flack et al., vol. 439/26 Jan. 2006, pp. 426-429 and vol. 406/ Jul. 27, 2000, pp. 378-382.

The Thin Red Line Between Success and Failure: Path Dependence in the Diffusion of Innovative Production Technologies, Henrich R. Greve et al. 2014, 22 pages.

Towards Explanation of Scientific and Technological Emergence, James R. Michaelis et al., 7 pages.

Bayesian Network Models of Portfolio Risk and Return, Chaterine Shenoy and Prakash P. Shenoy, 15 pages.

* cited by examiner

SYSTEM AND METHOD FOR DETECTING AND FORECASTING THE EMERGENCE OF TECHNOLOGIES

CROSS-REFERENCE TO RELATED APPLICATIONS

This application claims the benefit of U.S. Provisional Application No. 61/810,286, filed on Apr. 10, 2013. The entire disclosure of the above application is incorporated herein by reference.

FIELD

The present disclosure relates to a system and method for detecting the evolution of technology and, more particularly, to a system and method for detecting disruptive or highly innovative technologies and for forecasting the forecasting the movement or integration of the technology with other technologies.

BACKGROUND

This section provides background information related to the present disclosure that is not necessarily prior art. For years researchers have sought to analyze bibliographic data related to technical papers and patents to gain insight into emergent technologies. Heretofore, however, most citation analysis is limited to identifying which technologies are important retrospectively. These techniques have not been able to determine at times near publication which technologies will be important.

SUMMARY

This section provides a general summary of the disclosure, and is not a comprehensive disclosure of its full scope or all of its features. The computer implemented methods and systems disclosed herein provide a computer-implemented system, which defines a social network showing and using the linkages and interactions of technologies. According to one embodiment, the system looks to epidemiological models as an analogy for pandemic spread or integration of technology through this network as well as to determine when an outbreak of a new technology is occurring or has ended.

According to the teachings, the system utilizes epidemiological detection algorithm to determine when an exponential or logarithmic growth in a technology is occurring.

According to augmented teachings, the system analyzes a portfolio of technologies found technical literature such as publication, patents, and published patent applications and provides business and policy makers with an analytical technique to judge which technologies are (important and moving). The system introduces a new approach that reorganizes the informational return of a prospective view of the linkages in technology and watching in real-time the filing of patent applications to evaluate commercial interest in a technology. A dynamic optimization model of the interaction of technology areas as well as a technology potential evaluation model was developed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

While the complete story of the value of a particular technology is not told by the number of technical publications on a topic or the number of patent applications filed in a year or the new measurable diffusion of the technology, clearly the level of industrial interest can be gleaned from these data. Each published technical paper or filed patent application represents a bet by some entity that a particular technology will become economically important. To develop the technology needed to file produce a technical publication or a patent application, organizations expend both engineering and legal time as well as capital. The wished-for payoff for this investment is the monopolistic control of a section of the technology space. As described below, data is analyzed on the publication of printed publications or patent applications, as well as issued patents, with an eye toward signals of technological emergence.

Figure 1:
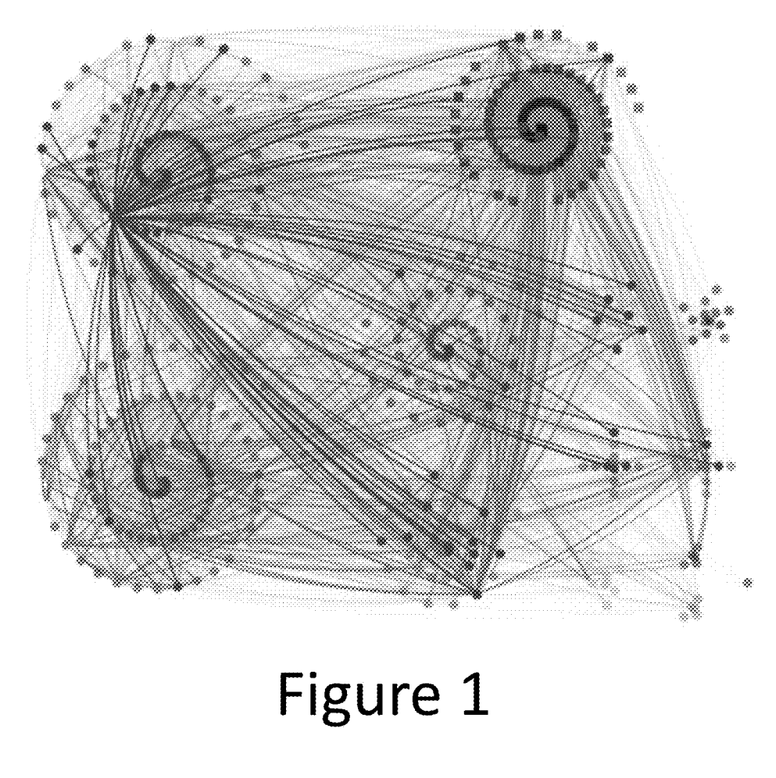
FIG. 1 represents a weighted social network of technologies according to the present teachings and associated linkages to a first technology.

As described in detail below, a computer-implemented system defines the linkages between technologies to form a social network of technological space. FIG. 1 depicts a representative weighted social network map of the linkages of all of the classifications within the United States Patent and Trademark Office (USPTO) classification system. In many circumstances, the linkage between two classes is very strong, as evidenced by a large number of patents referencing both classes and represented by heavily weighted edges in the figure. In a social network context, this means the linked technologies are closely related.

Figure 2:
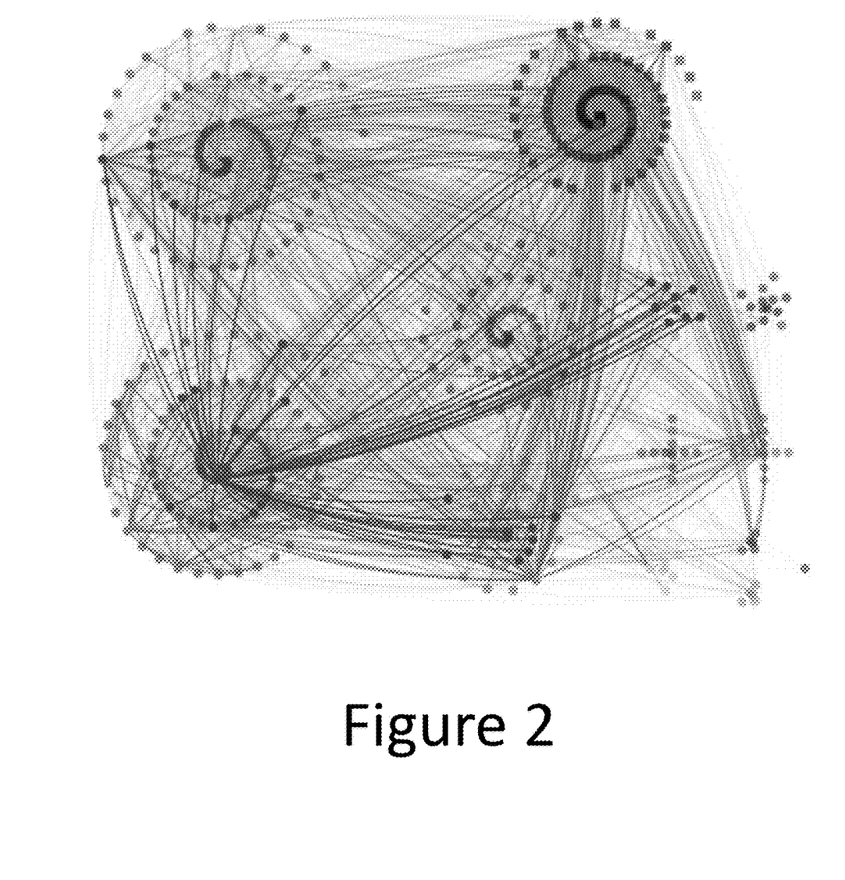
FIG. 2 represents a weighted social network of technologies according to the present teachings and associated linkages to a first technology.

The darker lines in FIGS. 1 and 2 thus represent as many as hundreds of interactions between a pair of classes, while the light lines represent only a few linkages. Cumulatively, thousands of pairs of classification linkages between two closely related fields may occur on the face of patents. As an example, Class 128 for surgery and Class 623 for prosthesis have been co-cited on patents more than 1000 times since 1976. In other circumstances, some classifications engage each other very rarely. In these situations, we can say that the technologies are weakly linked. Lastly, in some circumstances, classifications are simply not related and do not engage each other at all. For example, since 1976, Class 449 for bee culture has never been co-cited with Class 438 for semiconductor device manufacturing. Generally, these linkages are indicative of the co-applicability of a pair of technologies. While shown as the linkage between classifications within the USPTO, it is envisioned that linking Class/subclasses within the same system can use finer linkages. While the linkages between the documents are formed using technical definition from the USPTO class system, it is envisioned other technology definitions can be used by way of non-limiting example using IPC codes, or F-codes from the Japanese patent Office.

FIGS. 1 and 2 show the USPTO social network map interaction for two distinct technologies (20, 30) related to emission controls over a ten-year period respectively. An increase in the number of technologies linked one technology is clearly evident over this time interval. These interactions represent instances in which industry has attempted to solve particular technical problems using or implementing the emission control. In some cases, the application of emission control to solve problems in non-obvious technical areas represents non-obvious improvements to these areas. Industry and policy makers can use changes in this signal as an indication of technical importance. In fact, these now mappable events have long been recognized by the USPTO and the Courts as indicia of non-obviousness.

Figure 3:
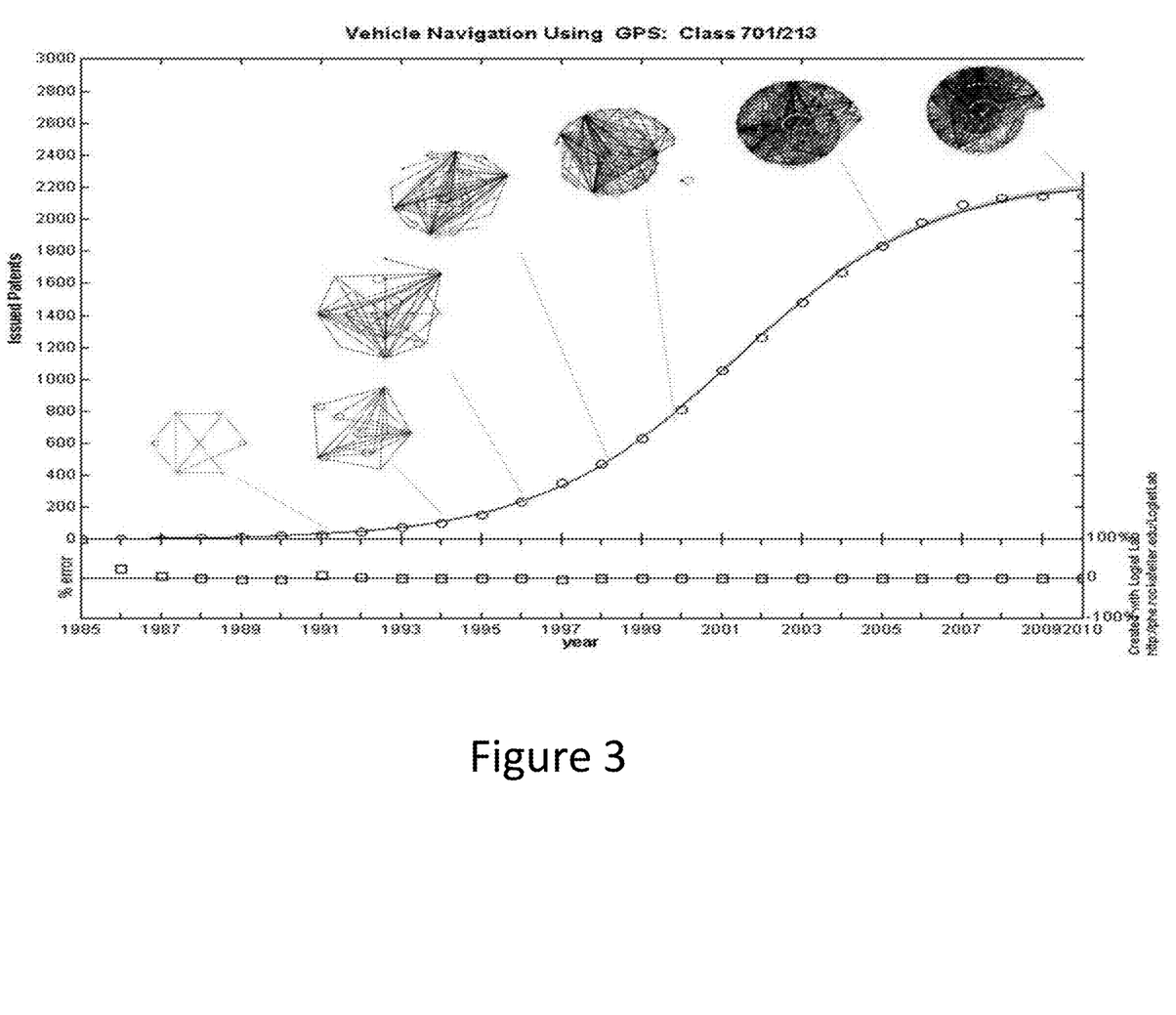
FIG. 3 represents an logistic growth of a technology as well as the associated spread or interactions of technologies related thereto.

Viewing growth in publications has long been recognized as a mechanism to view the growth of technologies. As seen in FIG. 3, which is a basic representation of the number and sum of patents issued in the area of GPS when viewed at the sub-class level, exponential growth occurs in the published patent applications related to GPS. While shown for issued patents by filing date, it is more useful to use the sum of the number or published applications as a function of application year. Additionally, it may be useful to plot or track pas a function of publication date or issue date, however it has been found that the use of application date or paper submission date gives a superior indication of when a linkage of a technology has been discovered. Also shown on the figure are linkages between GPS and other technologies through time (40). These linkages are by way of example—new electronics and antennas being used with GPS, the use of GPS in various devices, and software associated with GPS. As can be seen, as the number of documents associated with a technology increases, the technology is linked or associated with more and more technologies until a point when all other uses are non novel or obvious. The number of persons placing bets in the space decreases and therefor the size of the detection signal calculation will decrease indicating that while the technology may be spreading, the number of new uses for the technology may be limited.

To determine if a technological breakout is occurring, the system uses an epidemiological detection algorithm, such as, but not limited to CUSUM, EAR, Farrington algorithm, NBC for creating a visual representation permitting a mathematical determination of when a step change in a technological advancement has occurred. When a step change has been determined to occur, the system makes a determination when a technology is spreading or integrating with other technologies through the network or into other technological areas. The method includes identifying a time window for conducting the analysis. Time slices for select technological advancement filter criteria are determined. Next, time slices within a time window of a trial period of the technological advancement to be analyzed are determined. A microprocessor is used to determine which of the time slices meet filter-criteria. When the time slices meeting the filter criteria a signal indicative of a technology emergence is provided. The filter criterion can be, for example, an epidemiological detection algorithm that can be by way of non-limiting example a CUSUM detection algorithm.

A plurality of slice blocks that is equal to a plurality of the time slices that met the filter criteria of the technological advancement is provided, so that the trial block is comprised of a number of slice blocks equal to the plurality of time slices. The measured data is compared during the trial period against data observed that are in the time slices. A visual representation is created for determining when a step change in the technological advancement has occurred. The filter criteria can include at least one of document publications having an initiation date within a date range being above a predetermined level, a number of publications having a publication date being above a predetermined level, a number of publications having a documents having an issuance date within a predetermine interval, the number of links between documents having predefined technology designations and combinations thereof. Determining that a step change in a technological advancement has occurred can include, determining a step change in the technological advancement using a CUSUM calculation.

The method for creating a visual representation permitting a mathematical determination of when a step change in a technological advancement has occurred, can contain the steps of: (a) identifying, using a microprocessor a scientific advancement trigger and scientific advancement constraints associated with the scientific advancement trigger; (b) determining using the microprocessor a sample frequency for the scientific advancement trigger; (c) defining a time slice for dissecting historical process data; (d) calculating length of a data array as a function of the sample frequency and size of the time slice; (e) identifying minimum samples within an array meeting the scientific advancement constraints associated with the scientific advancement trigger; (f) identifying all the time slices meeting criteria of the steps (a)-(e) for defining a time window; (g) calculating a value for a dependent variable for each defined the time slice; (h) calculating additional dependent variables by averaging all sampled observations in each the time slice; (i) calculating a visual representation for the dependent variable; and (j) displaying the visual representation for the dependent variable for a user.

The step of calculating a visual representation for the dependent variable and displaying the visual representation includes calculating and displaying dates on which the dependent variable exhibited step changes. The steps of calculating a visual representation for the dependent variable and displaying the visual representation includes calculating and displaying dates on which the dependent variable exhibited best performance and worst performance. Optionally, the step change in the technological advancement via an ex post facto calculation.

The method of determining the flow of a technology concept further can include providing a corpus of a first plurality of documents. Nodes of a social network are defined, with each node representing at least one technological definition. At least one pair of unique definitions is applied to a plurality of documents within the corpus of documents. An edge for the social network is defined as the occurrence of two unique technical definitions being applied to a single one of the first plurality of documents. An edge weight can be calculated by counting the number of documents within the corpus having the two unique technical definitions.

A second set of additional documents can be added to the corpus of documents, at intervals of time. The intervals can be regular or non-regular. Just as with the documents within the corpus, technical definitions are assigned to each of the second set of additional documents. An array of edge weight edge weights are determined by counting the number of all documents within the corpus having the two unique technical definitions. The edge weigh array can be recalculated periodically by an analyst using the original edge weight and including a count of edges formed by the second corpus of documents.

As described above, changes in the number of documents identified with a technology node can be monitored to determine if there is an emergence of the technology. This growth generally indicated refinement of an important technical concept or the spread of a technology into new areas.

A probability that a new technology developed in an existing categorization will move to a new categorization of sub categorization can be determined from the edge weights of previous linkages between categorizations. For example, the probability that a new technology having a first technology definition will be connected to or integrated with a second technology within a predetermined amount of time is a function of the edge weight of the linkages. This probability can be defined by the proportion of edge weights associated with edges linked to a technology node. It has been determined that the distribution of edge weights associated with a particular technological definition node is generally represented within a power law distribution.

A second important factor in determining where a new technology will be applied is by determining which of the associated or linked technology definitions of the social network are experiencing a technological breakout. Breakout technologies have a higher probability to be applied to or absorb technologies from breakout areas, as engineers are looking for the newest technology to solve or address problems at hand. It has been determined that a particular technology will be linked to another technology which is experiencing a new technology breakout. Therefore, the probability that a technology has or will spread into or from a technological node.

As described above, the determination of whether a technology definition is experiencing a technological breakout comprises the step of determining a step change in the technological advancement using an epidemiological calculation. This determination can occur by determining whether a technology definition is experiencing a technological breakout using the step of determining a step change in the technological advancement using a CUSUM calculation.

Figure 4:
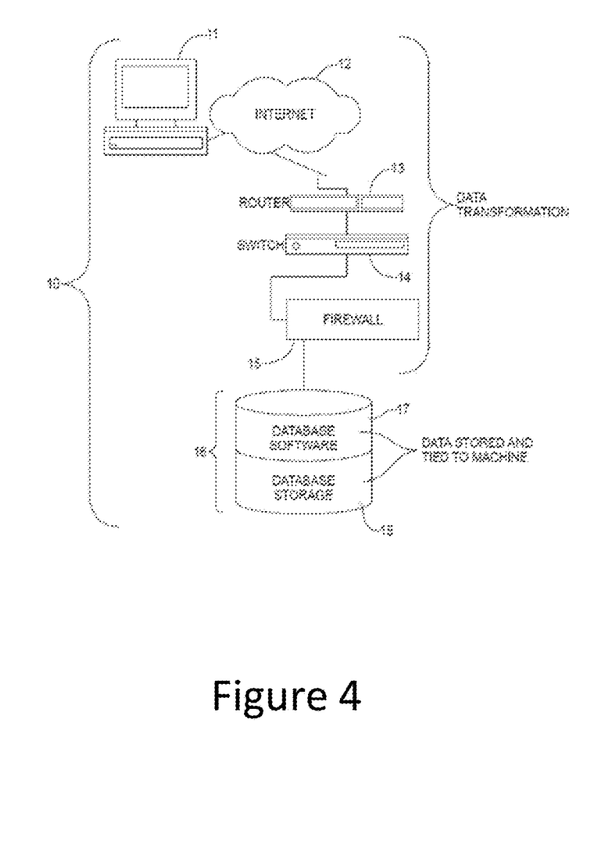
FIG. 4 represents a system diagram.

FIG. 4 represents a flow of information throughout the system 42. Referring to FIG. 1, a computer system 10 is shown. The computer system 10 incorporates a user interface apparatus 11 within a computer device, for example a graphical user interface (GUI), which connects to the Internet 12. As well known in the art, the user interface 11 is connected to the Internet 12 through a router 13 and switch 14. A router 13 joins a local area network (LAN) to the wide-area network (WAN) of the Internet. A switch 14 is the central device in a LAN that directs traffic across the LAN. The firewall 15 blocks unauthorized access to the computer system while permitting authorized communications. The database 16, stored on a second computer device, is accessible from the computer system through the Internet. The database software 17 can be, for example, a database management system (DBMS). The DBMS is a set of software programs that controls the organization, storage, management, and retrieval of data in a database. The database storage 18 stores data such as information, texts, images, or media files.

As shown, software 44 as shown above is downloaded into a computing device 46. As described above, result data can be forwarded via email, MMS, SMS, HTTP or email to an analyst, a system administrator's computer 48, or a device. The system for managing emergence levels in a management specialist can have an install module 48, a setting module 50, a logbook 52, a data export module 54, a reminder module 56 a structured data configuration module 58, a reporting module 60, a communications module 62, and an analytics module 64. The system functions to shepherd the function of the software on to the device using the install module 48. Optionally, the install module 48 will interface with a computer to automatically install updates to the software or pre-set variables or setting. From the install module 48, the system allows the home screen 66 to function as a central point within the software.

From the home screen 66, the user is prompted to go to the setting module 48. When started, the setting module 48 prompts or allows the user to set parameters such as word or phrase count levels, units, emergence levels and technology transfer times. The setting module 48 also allows the user to set data sharing parameters in the data export module 54. These parameters can include which people or technology integration information should be shared.

The setting module 48 also allows the user to set a reminders list in the reminder module 56. As described above, the reminders can include timing for emergence, time to refresh the documents within a document collection or corpus or technology integration. The home screen 66 allows the user to initiate the report module 60. The report module 60 allows the user to view trend reports for the various data configuration procedures and technology 8 integration parameters. From the reports module 60, the user can initiate the logbook 52. Optionally, the logbook 52 can be directionally initiated from the home screen 66.

It is envisioned that the above described system can be used to evaluate the R&D and intellectual property portfolio of a particular organization. In particular, the above-described system can be used to determine if a particular organization is leading or lagging on the technology s-curve for technologies they are filing patent applications for. Additionally, the relative value of a technology can be determined by determining if an application is "early" in the development curve or late. The system can also be used to determine likely places that the technology can be applied by determining which linked technological areas are presently experiencing exponential growth. Alternatively, by monitoring the spread of technologies into heretofore-unrecognized linked areas, the system can determine truly disruptive technologies.

The method and system can be run by a computer using a relational database of hand the manipulation of the data. In this regard, a Macintosh computer running Filemaker™ can be used, the database which uses tables that stores information in record which represents member location in the computer can create a visual representation permitting a mathematical determination of when a step change in a technological advancement. The database can be coded having the steps of: identifying time slices for select technological advancement filter criteria. These time slices can be time related, such as days, weeks, months, or years and the time slices can be defined by a user.

The database can then define time slices within a time window of a trial period of the technological advancement being analyzed. The database can then, using a microprocessor determine which the time slices that meet the filter criteria, the time slices meeting the filter criteria defining a positive detection block. The database can then, create a plurality of slice blocks that is equal to a plurality of the time slices that met the filter criteria of the technological advancement, so that the trial block has a number slice blocks equal to the plurality of time slices. By sorting the results, a ranking of measured data during the trial period against data observed that are in the time slices is performed by the database. The database can then, produce a visual representation for determining when a step change in the technological advancement has occurred.

The database can use a filter criteria that includes at least one of, the number of document publications having an publication date being above a predetermined level, a number of publications having a publication date being above a predetermined level, and a number of publications having a documents having an issuance date, and links between documents having predefined technology designations. This can be accomplished by determining the difference in the numbers stored in an array of fields in the database. This can include determining a step change in the technological advancement using a CUSUM calculation, where: As its name implies, CUSUM involves the calculation of a cumulative sum (which is what makes it "sequential"). Samples from a process $x_n$ are assigned weights $\omega_n$, and summed as follow $$S_0 = 0$$

$$S_{n+1} = \max(0, S_n + x_n - \omega_n)$$

When the value of S exceeds a certain threshold value, a change in value has been found. The above formula only detects changes in the positive direction. When negative changes need to be found as well, the min operation should be used instead of the max operation, and this time a change has been found when the value of S is below the (negative) value of the threshold value.

The database can (a) identify using a microprocessor a scientific advancement trigger and scientific advancement constraints associated with the scientific advancement trigger; (b) determine using the microprocessor a sample frequency for the scientific advancement trigger; (c) define a time slice for dissecting historical process data; (d) calculate length of a data array as a function of the sample frequency and size of the time slice; (e) identify minimum samples within an array meeting the scientific advancement constraints associated with the scientific advancement trigger; (f) identify all the time slices meeting criteria of the steps (a)-(e) for defining a time window; (g) calculate a value for a dependent variable for each defined the time slice; (h) calculate additional dependent variables by averaging all sampled observations in each the time slice; (i) calculating a visual representation for the dependent variable; and (j) displaying the visual representation for the dependent variable for a user.

The database can make a determination of when a step change in a technological advancement has occurred, by determining if a threshold is met with respect to a calculation run on a time series of the number of documents available. This can for example include calculating and displaying dates on which the dependent variable exhibited step changes or calculating and displaying dates on which the dependent variable exhibited a signal indicative of exponential growth. This can for example be the step of determining a step change in the technological advancement via an epidemiological outbreak detection calculation such as the CUSUM calculation described above.

The database can database can be a mechanism for storing a corpus of documents, or information related information about the corpus of a first plurality of documents. The database can define a plurality of nodes, each node representing at least one unique technological definition. The database can store at least two unique technological definitions to a plurality of documents within the corpus of documents. The database can define an edge between a pair of nodes from the plurality of nodes as the occurrence of two technical definitions being applied to a single one of the first plurality of documents. This edge weight can be determined for example by counting the number of documents within the corpus having the same unique two technical definitions. The database can facilitate the addition a second set of additional documents to the corpus of documents at measurable time intervals. The database can store technical definitions assigned to each of the second set of additional documents. These technical definitions can be assigned by a human, or can be assigned using machine learning techniques. The database can then adjust and assign edge weights by counting the number of second set of additional documents within the corpus having the two unique technical definitions. This can include recalculating the edge weight by including a count of edged formed by the second corpus of documents by adding the old edge weights stored in a record or memory location to the new counted value. The database can then calculate a probability that a new technology having a first technology definition will be connected to a second technology having a second technology definition within a predetermined amount of time based on the edge weight of the linkages. This can be done by way on non-limiting example by determining the relative strength of a connection between technology areas and assigning a relative percentage probability to this edge weight. Additionally, for any other given area, a determination where along a logistic curve the new technology area is. This can give a relative indication that the area will be economically important enough that a person will apply the technology to this area. The joint probability is the probability for the two occurring using Markov or Bayes analysis. This included determining a probability includes determining whether a third technology definition is experiencing a technological breakout by for example determining a step change in the technological advancement using an epidemiological calculation such as a CUSUM calculation described above.

The database can include a data entry module configured to record a technology emergence and at least one technology integration parameter, a display module, a structured data retrieval module configured to run one of a data retrieving protocol, which is stored in a memory. An analysis module is incorporated into the database that is configured to transfer data from the data entry module to a log or storage module. The analysis module has a logic module configured to selectively initiate an epidemiological detection module to run one of the data retrieving protocols and recursively prompt the database to input data from the database. The display module presents a map of data indicative of one of technology emergence or technology integration. Optionally, the database can have a communications module is configured to transfer data via email, MMS, SMS, to an analyst. The logic module prompts the user for additional data based on changes in the levels of a technology integration parameter in the data log module. To measure a potential for a technology to spread, the logic module can determine a technology integration parameter is selected from the group consisting of an occurrence of a single document including a first and a second technology concept, an exponential growth in a number of documents including a technological concept, and emergence signal based on an epidemic evaluation. This technology integration parameter is a variable which indicates how far along an s-curve or logistic curve the technology lies at any given time. Additionally, the number of applications filed in a particular s-curve is an indication of the importance of a technology, and gives a further indication of the importance of the technological disclosure.

A system for managing emergence levels of a technology, the system comprising: a data entry module configured to record data related to a corpus of documents; a setting module configured to accept user defined parameters; a logbook module having a memory to track and memorialize changes in the technology emergence and at the at least one technology integration parameter; and an analytics module configured to transfer data from the data entry module, the settings module, and the logbook to selectively initiate a data retrieval protocol in response to the data and to run an epidemiological detection algorithm on data related to the corpus of documents and calculate oat least one of technology emergence and at least one technology integration parameter. The analyzer can interface with a structured data configuration module that utilizes a schema configured to manage a structured data configuration protocol. Optionally, the database can incorporate a reminder module configured to provide reminders through a display device, the reminders requesting the user to upload documents into a corpus of documents and at least one technology integration parameter through the data entry module. The data configuration protocol comprises a data configuration protocol and a data configuration protocol. Optionally, the database structure can include a data export module coupled to the analytics module where a user can set data sharing parameters.

A computing device for detecting an emergence of technology and providing a signal used by an analyst, holds the above discussed database. The computer includes a display device, a data entry interface configured to receive data related to a corpus of documents and store the data related to a corpus of documents in a log residing on the device. A data store that stores a plurality of structured collection procedures is included where each of the structured collection procedures specifies one or more collection events for obtaining data related to a corpus of documents. A selection module that operates selectively to analyze the data related to a corpus of documents in the log and select a given structured collection procedure from the plurality of structured collection procedures. The computer can include an administrative module in data communication with the data store and operable to prompt the analyst, via the display device, to input data related to a corpus of documents into the data entry interface, where the prompting of the analyst is in accordance with the given structured collection procedure. The data analysis module that operates selectively to analyze the data related to a corpus of documents in the analyst log and transmit data indicative of one of a technology structural or temporal condition when a level of result data is outside of a predetermined window.

Figure 5:
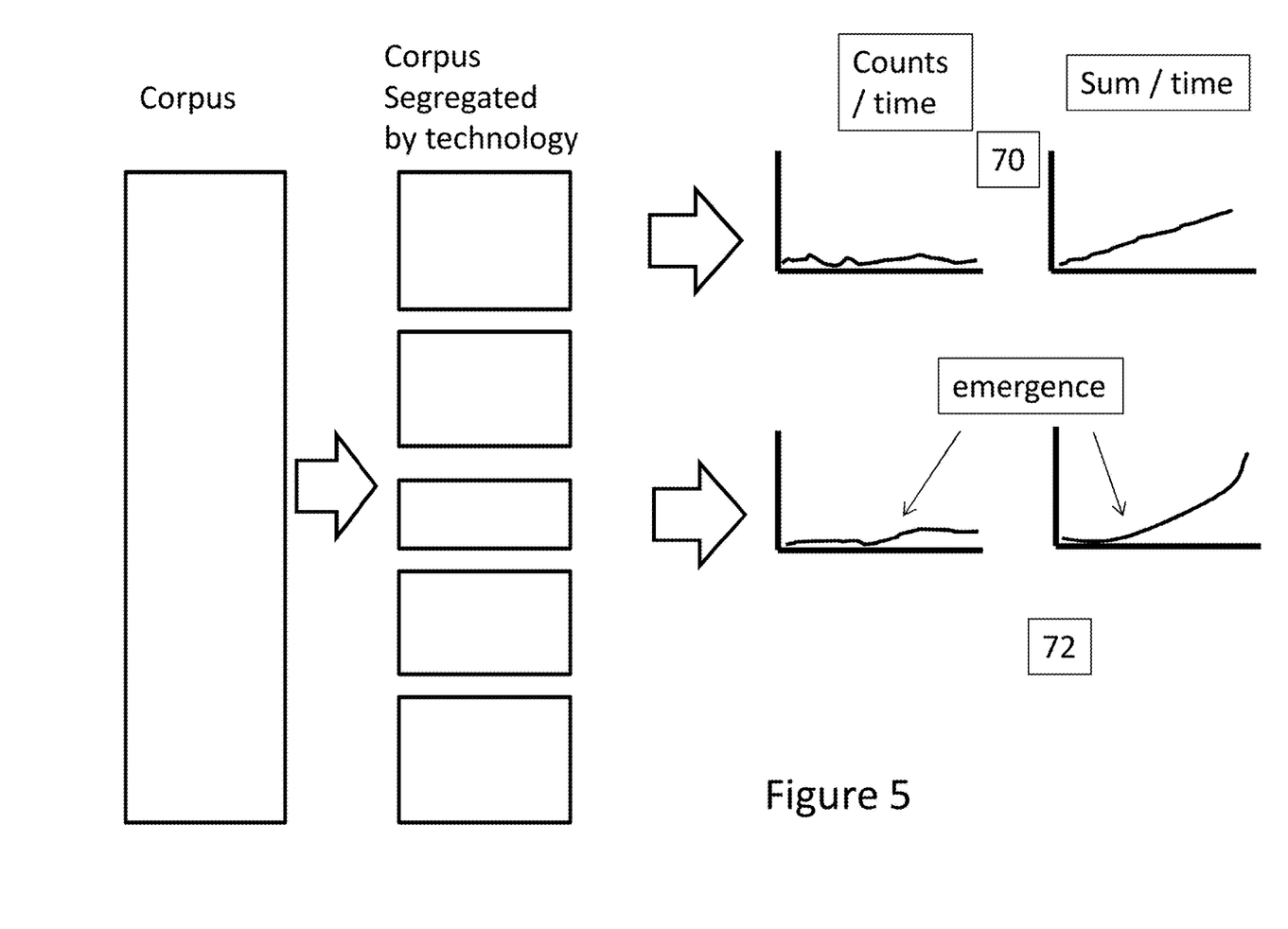
FIG. 5 represents the application of the teachings of the present disclosure.

FIG. 5 represents the application of system according to the present teachings. Show, the Corpus of documents is provided. These documents are segregated based on technological definition. Each of these sets of segregated documents is ordered by time. This data set is then again segregated into bins which as described above can be for example daily, weekly, monthly, and yearly. Counts of the number of documents in the BIN or array are typically stored in a table with for instance a database. The epidemiological detection algorithm is run on the array to determine if there is an epidemiological outbreak or emergence in the importance of a technology. In some circumstances, the technology definitions are typically rather flat and represent a linear growth 70, while in others, the represented growth is linear, then becomes exponential. While not as robust in detecting emergence as the epidemiological methods, exponential growth can be detected using other functions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method might be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term-shared processor encompasses a single processor that executes some or all code from multiple modules. The term group processor encompasses a processor that, in combination with additional processors, executes some or all code from one or more modules. The term-shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium and may, therefore, be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below.

The invention claimed is:

1. A computer-implemented tool for use by technical workers to engineer and develop technological innovations more quickly and with heightened assurance that those technological innovations receive infusion of emerging new technologies, comprising:

a specially programmed computer that accesses a predefined data store containing information about published technical documents, the data store organizing the published documents according to a predetermined set of different technical areas and including information reflecting dates of first publication of said technical documents, the computer being programmed to detect the publication of documents newly emerging in a first technological area and to assess whether the emergence in that first technical area is undergoing exponential growth;

the computer being further programmed to associate the first technical area in which exponential growth is detected with a second technical area, wherein the second technical area is identified by using the computer to access a non-transitory computer readable memory storing a network representation of linkages among a plurality of different technical areas, including the first and second technical areas, with each of the linkages being coded based on historical data to indicate the likelihood that information about one technical area will flow by human interaction to another technical area, the computer thereby providing information to a technical worker in the second technical area of the onset of the exponential growth in the first technical area, with assurance that the emerging technology in the first technical area is suitable for technologically improving the second technical area, based on the fact that connections between the first and second technical areas have occurred in the past.

\* \* \* \* \*